Sept. 7, 1965 G. T. CULBERTSON 3,205,411

TIMING NETWORK

Filed Oct. 26, 1960

INVENTOR.
GEORGE T. CULBERTSON
BY Owen & Owen
ATTORNEYS 3,205,411
TIMING NETWORK
George T. Culbertson, Gardena, Calif., assignor, by mesne assignments, to Master Specialties Company, Gardena, Calif., a corporation of California
Filed Oct. 26, 1960, Ser. No. 65,213
4 Claims. (Cl. 317—142)

This invention relates in general to timing networks and more particularly to timing networks to control the operation of a load device after a predetermined period.

Semi-conductors for controlling the operation of output load devices have a vast number of advantages over mechanical or tube devices presently available in the art. Semi-conductors are compact, rugged, require little or no maintenance, have long life characteristics and do not suffer from vibration. Accordingly, one of the objects of this invention is to provide a timing network, or time delay circuit, including semi-conductor devices.

In my prior application, Serial No. 7,410, filed February 8, 1960, assigned to the same assignee as this present invention, I have described and claimed a double-base diode semi-conductor with an output load device in the emitter to base one path of the semi-conductor. In that application the charge on a timing capacitor fires the double-base diode and expends most of its energy to control an output load. Oftentimes, it is desirable to control output loads from a further device isolated from said timing capacitor. Accordingly, a further object of this invention is to utilize the firing of a double-base diode as a control signal to initiate a further device into energizing a load.

Yet another object of this invention is to provide a load circuit in series with a control device wherein a minimum of energy is expended across the control device allowing for efficient operation from a power source. The control device of the present invention is a controlled switch, or a controlled rectifier or equivalent, which has a characteristic similar to a gas tube thyratron. That is, it will remain in an off state until turned on or fired by a signal of low level. Once fired, the input signal may be removed without affecting the conducting state. Unlike a gas tube thyratron, the semi-conductor controlled switch has a forward voltage drop which is much lower so that the efficiency is much improved. Of course, it is also much smaller, more rugged and has a stable firing level. The operation of a controlled switch is described more fully hereinafter.

These and other objects are achieved briefly through an efficient time delay circuit utilizing the firing of a double-base diode to initiate conduction to an output load through a controlled switch.

Figure 1:
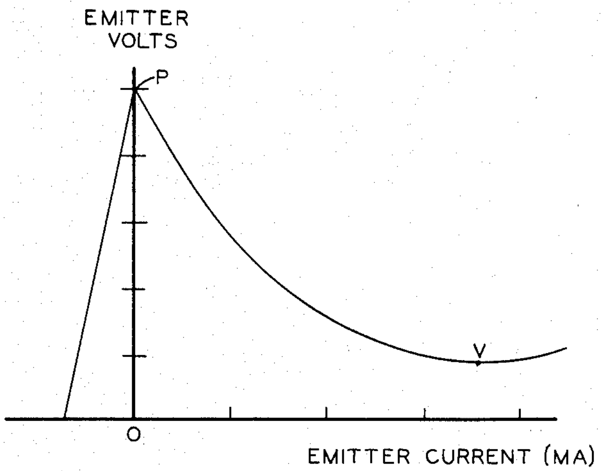
Figure 2:
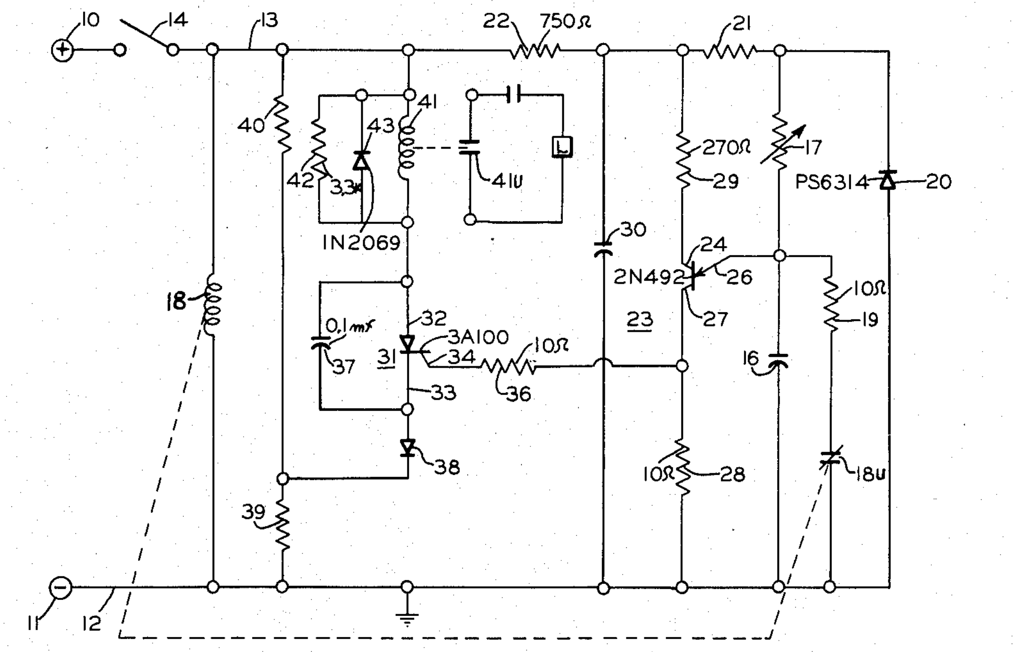

The features of the invention which are believed to be novel are set forth with particularity in the appended claims. The invention itself, however, both as to its organization and method of operation, together with further objects and advantages thereof may best be understood by reference to the following description when taken in connection with the following drawings, wherein:

FIG. 1 illustrates an emitter voltage-current characteristic curve for a double-base diode utilized in the invention; and FIG. 2 is a schematic circuit diagram of a preferred embodiment of the invention.

The circuit of FIG. 2 includes terminals 10 and 11 for receiving respectively a positive and negative direct current line potential. Terminal 11 is connected to common line 12 and may be considered a ground or reference line. Upper line 13 connects to terminal 10 through a switch 14 which is selectively closed to begin the time delay period for operation of an output load. It is understood that switch 14 may be a manual switch under the control of an operator or may be an electronic or electro-mechanical switch automatically controlled to initiate a timing cycle. A timing circuit including series connected capacitor 16 and timing resistor 17 is connected across the lines with the lower end of capacitor 16 directly grounded. Charging resistor 17 is shown as being adjustable to vary the charging period although it is understood that capacitor 16 may be adjustable as is well known. The contacts 18*u* of relay 18 are in series with small valued resistor 19 across capacitor 16. Relay 18 is directly across lines 13 and 12 to sense the presence of line voltage. When relay 18 drops out, the capacitor 16 discharges through resistor 19 which prevents contact pitting.

Zener diode 20 connects across the timing circuit in its high impedance direction to regulate the voltage applied thereto. The upper end of diode 20 has joined to it a small resistor 21 which connects to line 13 through dropping resistor 22. Resistor 22 serves to absorb the major line voltage variations and resistor 21 acts to give a minimum variation in timing with such voltage changes. Double-base diode 23 sometimes termed a unijunction transistor, has a base two electrode 24, an emitter electrode 26 connected to the upper end of capacitor 16, and a base one electrode 27. Base one 27 connects to ground through triggering resistor 28 whereas base two terminal 24 connects to the junction between regulating resistors 21 and 22 through temperature compensating resistor 29. Resistor 29 is selected to compensate for changes in temperature which would otherwise be responsible for an untimely firing of the transistor 23. The unijunction transistor has a positive temperature coefficient and the inclusion of resistor 29 accounts for a repeatable timing cycle as may be understood from the following equation:

$$V_P = kV_{BB} + V_D \quad (1)$$

where $V_P$ is the peak voltage P which will be more fully explained in connection with FIG. 1 hereinafter, $k$ is essentially a constant termed the intrinsic stand-off ratio, $V_{BB}$ is the interbase voltage and $V_D$ is the diode junction potential. It has been found that $V_D$ decreases with increasing temperature and may be offset by an increasing $V_{BB}$ factor by adding resistor 29 to absorb the voltage changes. Capacitor 30 diverts any transients or voltage spikes appearing on the line from causing a premature or delayed firing of the transistor.

The controlled switch semi-conductor 31 has an anode electrode 32, a cathode 33 and a gate 34 which connects to the top of triggering resistor 28 through a resistor 36. A capacitor 37 shunts the anode to cathode of switch 31 to prevent false triggering from line voltage transients. The cathode 33 is connected through forward poled diode 38 and bias resistor 39 to ground. Intermediate elements 38 and 39 is one end of voltage dropping resistor 40 which has its opposite end connected to line 13. Resistors 39 and 40 are included to establish a bias on switch 31 to preclude a premature firing which may result, for example, from a coupling from anode to gate of a positive transient signal. The capacitor 37 also prevents this firing and the added resistor bias is merely a safety feature which may be eliminated. In the event the voltage across resistor 39 is in danger of exceeding the gate to cathode reverse voltage, diode 38 must be added. Under many operating conditions, resistor 36 alone may supply the required bias off current of switch 31. The load for switch 31 is indicated as a relay with winding 41 connected from anode 32 to line 13 and shunted by resistor 42 and reverse poled diode 43. The diode is included to eliminate the voltage surge when power is removed and the field of the inductive load collapses. Resistor 42 is included to assure that switch 31 is triggered on even by a short gate pulse in view of the inductive relay coil. Contacts 41$u$ of relay 41 control energization of an output circuit in a known manner.

Referring now to FIG. 1, the operation may be more readily understood by describing a double-base diode. It generally comprises an "N" type semi-conductor bar mounted between base one and base two ohmic contacts with a "P" type emitter. With the interbase potential maintained constant, the voltage applied to the emitter may be used to control the device. When cut-off, the potentials are such that the emitter is back biased. Then, when the emitter potential is raised sufficiently. "holes" are injected into the bar towards base one by the bar field potential, the emitter current then increases rapidly until limited by the emitter potential source. With the interbase voltage constant, there is a slight reverse emitter current to the left of peak point P. As the emitter potential is increased to peak point P, the PN junction becomes biased in the forward conducting region. Between P and valley point V, the device has a negative resistance region with a rapid increase of conductivity between emitter and base one. To the right of point V, base one reaches saturation and any further increase in emitter current merely provides an additional voltage drop between the emitter and base one.

Controlled switch or controlled rectifier 31 is a PNPN device with the anode connected to the outer P zone, the gate connected to the remaining P zone and the cathode connected to the outer N zone. The operation of the device may be understood by considering the analogy of an upper PNP transistor and a lower NPN transistor with the base of each joined to the collector of the other. The positive feedback loop gain is equal to the product of the current gain of each transistor. When the loop gain reaches unity, it becomes selfregenerative. A small negative current applied to the gate reduces the loop gain and cuts the device off. A positive current on the other hand turns the NPN transistor on and since the current gain increases with an increase of collector current, the circuit becomes regenerative. Both transistors reach saturation reducing the impedance between the cathode to anode to a very low value. Once fired, the gate positive current may be removed since the PNP collector supplies sufficient current to the NPN base. The circuit remains on until the collector current is reduced below the unity gain level. The functions of these two transistors are combined in the controlled switch into a single semi-conductor wafer.

In operation of FIG. 2, the closed contacts 18$u$ maintain capacitor 16 completely discharged until switch 14 is closed energizing relay 18 and opening contacts 18$u$ to begin the charging of capacitor 16 through resistor 17. When capacitor 16 acquires a voltage equivalent to P of FIG. 1, transistor 23 fires and capacitor 16 discharges through the emitter to base one PN junction and through triggering resistor 28 which develops a positive potential at its upper end. Transistor 23 moves down its curve beyond valley point V into its saturation range. Meanwhile, controlled switch 31 is at cut-off due to the bias current of resistors 39 and 40 as well as the negative current through resistor 36. When transistor 23 fires, positive current is supplied to the gate 34 which overcomes the bias to initiate the regenerative gain within switch 31 and to cause a very high power gain through the device to energize relay 41. Once fired, switch 31 remains on until the member 14 is opened. When relay 41 pulls in, it closes contacts 41$u$ to control an output circuit. When switch 14 is opened, diode 43 absorbs the energy stored in relay 41. Switch 31 has an exceptionally rapid turn on and turn off time allowing for a second timed operation immediately after switch 14 is opened terminating the first control to the output circuit.

Although the description of this invention has been set forth with respect to a particular embodiment, it is not to be contrued in a limiting sense. Many modifications and variations within the spirit and scope of the invention will now occur to those skilled in the art. For the scope of the invention to be covered, reference is made to the appended claims.

What I claim is:

1. In an interval timing network, in combination, a double-base diode having a body of semi-conductor material, a first and a second spaced ohmic base connection on said body, a rectifying emitter junction intermediate said ohmic connections, a timing circuit including a resistor and timing capacitor joined together and connected to said emitter junction, start switch means, input lines for receiving a single direct current operating potential when said start switch means is operated, circuit means connected to said input lines charging said capacitor towards a fixed direct current potential, triggering means receiving a positive potential when said double-base diode fires in response to said capacitor reaching a predetermined charge, a controlled device connected to said single direct current operating potential and having a PNPN semi-conductor body with a cathode, anode and gate electrode, said controlled device having a regenerative loop gain exceeding unity in its fully conducting state so as not relying upon the triggering positive potential for continued conduction to an output load means after said controlled device first becomes conductive, bias means including a resistive divider connected across said input lines and having a junction intermediate thereof connected to the cathode of said controlled device, said bias means maintaining said controlled device nonconducting during the charging of said timing capacitor, an output relay winding in the anode to cathode path of said controlled device, a reversely poled diode shunted across said output relay winding, circuit means coupling a triggering signal from said triggering means to the gate of said controlled device to enable a saturated conducting condition of said controlled device and energization of said output relay winding.

2. The combination of claim 1 wherein a diode is connected in a forwardly poled direction in the cathode circuit of said controlled device.

3. The combination of claim 1 wherein a sensing relay winding is connected across said lines with contacts associated therewith connected across said timing capacitor, said sensing relay winding becoming energized upon operation of said start switch means and thereafter becoming deenergized upon opening of said start switch means to fully discharge said capacitor enabling an accurately timed recycling operation.

4. Time delay apparatus adapted to provide an output a predetermined time after the application of a continuous input signal thereto, and adapted continuously to provide said output so long as the input signal remains, which comprises, a pair of input terminals adapted to have the input signal applied thereto, voltage regulating means connected across said terminals and including a breakdown diode, an RC circuit connected in parallel with said breakdown diode and including a capacitor having discharge means normally shunting the said capacitor, means rendering inoperative said discharge means when an input signal is applied to said apparatus, a controlled transistor having a control electrode connected to one side of the capacitor whereby the charge of said side will bias said controlled transistor and cause same to conduct at some predetermined condition of charge, a controlled rectifier having a gate electrode connected to said controlled transistor and including an anode-cathode circuit connected between said terminals, and an output device connected in the anode-cathode circuit for providing said output when said controlled transistor conducts, and so long as said input signal is applied to said input terminals, said controlled transistor comprising a unijunction transistor having its base terminals connected in parallel with said RC circuit and having means establishing a predetermined gradient of current flow in said base.

References Cited by the Examiner

UNITED STATES PATENTS

| | | | |
|---|---|---|---|
| 2,867,754 | 1/59 | O'Bleness | 317—148.5 |
| 2,947,916 | 8/60 | Beck | 317—148.55 |

OTHER REFERENCES

Parrish: "Rectifiers and circuits for DC Relays," Electronic Design; November 15, 1956; pp. 22–25.

"A New Transistor with Thyratron-Like Characteristics," IBM Corp., May 26, 1956, facepage, pages 1, 5 and 6 and FIG. 5.

"Notes on the Application of the Silicon Controlled Rectifier," Semiconductor Products Department, General Electric Co., December 1958, pp. 30–35, 54.

"Notes on the Application of the Silicon Unijunction Transistor," Semiconductor Products Dept., General Electric Co., May 1961, page 77.

GE Manual, "Controlled Rectifier Manual," First ed., edited by Semiconductor Products Dept., General Electric Co., copyright March 21, 1960; pages 131, 132.

SAMUEL BERNSTEIN, *Primary Examiner.*

LLOYD McCOLLUM, *Examiner.*